Figure 1:
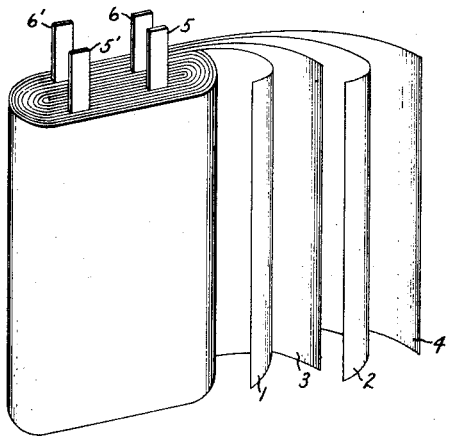

April 2, 1940.  F. M. CLARK  2,196,057
ELECTRIC CAPACITOR
Filed April 15, 1938

Inventor:
Frank M. Clark,
by Harry E. Dunham
His Attorney.

Patented Apr. 2, 1940

2,196,057

UNITED STATES PATENT OFFICE 2,196,057

ELECTRIC CAPACITOR

Frank M. Clark, Pittsfield, Mass., assignor to General Electric Company, a corporation of New York Application April 15, 1938, Serial No. 202,265

5 Claims. (Cl. 175—315)

The present application is a continuation-in-part of my prior application, Serial No. 708,621, filed January 27, 1934.

It relates to electric capacitors and is more particularly concerned with improved capacitors employing armatures or electrodes consisting of unoxidized material which, however, are capable of forming dielectric films thereon, these armatures being separated by a thin, dense, dielectric septum, and containing an electrolyte, which is non-aqueous in the sense that only the water of crystallization of an added salt need be present.

One of the principal objects of my invention is to provide capacitors which do not require filming of the electrodes before use. It is another object of my invention to provide a stable capacitor of high efficiency which will not deteriorate during periods of idleness.

It has been proposed, heretofore, to employ as an electrolyte in a capacitor or rectifier a solution of a suitable salt in a water-free polyhydric alcohol. Porous absorbent material has also been used as a supporting means for the electrolyte. Such material does not constitute a dielectric septum but functions rather as a support for the electrolyte. The electrodes employed in this type of capacitor are generally made of aluminum and are known as the "film type" electrodes. By "film" commonly is meant a dielectric layer consisting of oxide or hydroxide, which is formed on certain metals, for example aluminum, when subjected to a chemical process or to electrolysis in an aqueous solution. Such films may be prepared on the armatures prior to or after assembly of the apparatus by a special treatment which adds to the cost of manufacturing such articles. Furthermore, the employment of such "filmed" electrodes makes it necessary to put the capacitors containing them into service promptly and to maintain them in service without long interruptions as the film deteriorates when the device is not used.

I have discovered that a non-aqueous alcoholic solution of ammonium borate potentially can be used with marked advantages in connection with unoxidized film-forming electrodes, or armatures, such as aluminum or tantalum electrodes, and in combination with a substantially non-porous diaphragm of swellable dielectric material, such as kraft paper. Such substantially non-porous, dense sheet dielectric is not used merely as a spacer for the absorption of impregnant, but serves itself in a dielectric capacity, as indicated by the fact that the capacitor armatures need not be oxidized upon assembly.

Kraft paper is preferred as the non-porous dielectric element because of its peculiar swelling characteristics when heated with substantially dry ethylene glycol.

While the armatures or electrodes may become filmed during use, the operativeness of the capacitor does not depend on the presence of such films. During periods of non-use the electrode films may deteriorate but the presence of the dielectric septum allows the capacitor to be put into immediate use, dispensing with the special refilming of the electrodes.

The use of previously chemically oxidized aluminum foil in my capacitor would decrease the capacity and increase the power factor value as compared to the use of non-oxidized aluminum foil.

While it is permissible to use aluminum foil of the high degree of purity required in conventional electrolytic capacitors, aluminum foil of ordinary purity (such as is used in ordinary dielectric capacitors) can be used. Such foil ordinarily will produce improved power factor and higher capacity per square inch of active electrode foil area.

In general, the thinnest aluminum foil is desired. Regular capacitor foil of a thickness of .0003" to .0005" is preferred except for the highest electrical capacities and voltages. When the current-carrying characteristics of the foil are exceeded, it is preferred to retain the use of the thin aluminum foil, the low current-carrying properties of the thin foil being assisted by using a suitable number of additional conductors, or taps, for the armatures.

Capacitors embodying my invention have extraordinary high capacities for a given armature (electrode) surface. They have extremely small bulk, being assembled in a compressed state with the armatures separated only by the thickness of the paper or other dielectric septum. As already indicated, no preforming of the electrodes is required, and substantially no deterioration results in periods of idleness.

The introduction of a dielectric septum causes the capacity to drop as the thickness of the dielectric material increases, the change being slightly less than inversely proportional to the change in thickness.

Figure 2:
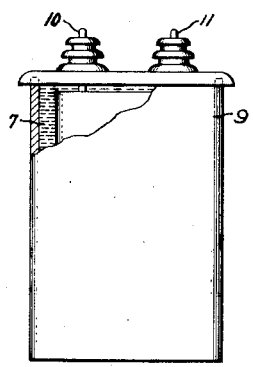

The accompanying drawing shows in side elevation a partly unrolled capacitor assembly which is provided with a paper dielectric member, and Fig. 2 shows in side elevation a complete capacitor in its case which contains a liquid composition made in accordance with my invention.

The electrodes of the capacitor shown in Fig. 1 consist of sheets 1, 2 of unoxidized aluminum, tantalum, or other suitable potentially oxidizable metal. Adjacent the sheets 1 and 2 are sheets 3, 4 of substantially non-porous cellulose kraft paper. When the sheets thus assembled are wound up, the sheets of dielectric 3 and 4 are interposed between successive layers of metal foil 1 and 2. Instead of a single sheet of paper it is preferable in some cases to employ two, or even three, sheets, but in the drawing a single sheet has been shown to avoid complicating the drawing. I prefer to employ kraft paper such as described in United States Letters Patent No. 1,850,702, issued March 22, 1932, to Amos Allen. Such paper has a density at least as high as about 0.95. Contact to the metal foil which constitutes the armatures of the capacitor is made by strip conductors, or taps, 5, 6, auxiliary taps being indicated at 5', 6'.

The capacitor assembly is subjected to the heated liquid impregnating material for at least about one-half hour at a temperature of 110° C., or higher, preferably 6 hours at 150° C. As already indicated above, ammonium borate is dissolved in alcohol for the preparation of the treating solution. As the alcohol I prefer to employ ethylene glycol, although glycerine, or other polyhydric alcohol in which the ionogen is soluble to the desired amount may be employed. The alcohol is distilled in a vacuum under conditions suitable for removing water vapor and other impurities. Ammonium borate preferably should be dissolved in the crystalline state, that is, without removing the water of crystallization. The alcohol should be employed as a saturated or nearly saturated solution. About 5 to 10 per cent by weight of the ammonium borate is present in a saturated solution of this salt in ethylene glycol. Ordinarily about 1 to 10 per cent of the borate ionogen should be present in the solution.

After impregnation of the assemblies in the polyhydric alcohol solution, the capacitors are tested at voltages as high as their rated voltage. During this voltage application the capacitors tend to heat and the temperature may rise even to the boiling point of the impregnant if ethylene glycol is used, in which case the rated voltage is applied intermittently in order to avoid too rapid boiling of the impregnant. It is desired in general to hold the temperature of the impregnant lower than 175° C. During this high temperature treatment under voltage of the kraft paper, the impregnant boils due to thermal effect and to decomposition under voltage. This serves to loosen the paper and foil assembly insuring a thorough penetration of the impregnating solution and its dissolved ionogen into the paper. The capacitor at this stage possesses poor electrical characteristics and a power factor of approximately 30 per cent at its rated voltage.

The final preparative step is a baking treatment which completely swells (pulps) the paper spacer and produces a dielectric assembly in which the paper is in pressure contact with the armatures. This effect is produced by heating the capacitor after the previously described treatment and while immersed in its impregnating electrolyte at a temperature of about 100° C. or higher for a period dependent on the temperature selected. The higher the temperature, the shorter the period of heating. This treatment may be designated "the paper swelling treatment." It has been found that heat treatment at 100° C. for from 6 to 8 hours is satisfactory. After such treatment, the capacitors prepared are characterized by high capacity per unit of active foil area and low power factor.

After the described treatment, the capacitor assemblies are hermetically sealed into containers with suitable sealing compounds, such for example as Montan wax, asphalts, or resinous compositions. In Fig. 2 is shown a distinct body of treating liquid 7 surrounding the capacitor assembly, but it should be understood that the assembly may, and preferably does, substantially fill the casing 9, the liquid merely wetting and adhering to the capacitor surfaces, the whole being covered with a sealing compound. The conductors 5, 6 are connected to the external contacts 10, 11.

The high capacity of a capacitor embodying my present invention may be made evident by a comparison of the same with a capacitor made up similarly of kraft paper treated with wax or mineral oil. In the case of a capacitor made up in accordance with my invention, approximately .3 square inch of active armature or foil surface will have a capacity of one microfarad. On the other hand, a wax or oil-treated capacitor having the same construction requires a foil or armature surface of about 8 to 10 active square feet for the same capacity of one microfarad. A capacitor, such as shown in the drawing, employing as armatures $\frac{3}{10}$ mil aluminum foil having a length of 1¾ feet and a width of 3¼ inches separated by two sheets of $\frac{1}{10}$ mil kraft paper, and treated as above described, has a capacity of about 500 microfarads. The power factor of a capacitor made in accordance with my invention varies with the voltage. At 6 volts per unit, the power factor is from 6 to 9 per cent. At higher voltages the power factor increases, rising to 9 to 14 per cent at 10 volts.

As the power factor is a measure of energy loss it is desirable to employ an arrangement which will keep down the power factor to a minimum and therefore I prefer to connect sufficient units of capacity in series to keep the voltage applied to each unit within the limits of commercially suitable power factor values. For example, when it is desired to connect a capacitor made in accordance with the present invention to apparatus operating at 110 volts, I prefer to connect 15 units in series, each unit therefore operating at approximately 8 volts, and giving a power factor of about 10 per cent. While with such a series connection the high efficiency of capacity will be reduced, it is still high as compared with wax or oil-treated capacitors, for example with a capacity of about 50 microfarads approximately 25 square feet of active foil surface are required when operating with a series connection of 15 units. In a wax-treated capacitor, which will operate directly on 110 volts as a single unit, about 400 square feet of active foil surface are required for a capacity of 50 microfarads.

The capacity characteristic of my capacitor is even higher than that normally associated with electrolytic capacitors. For example, in a highly etched foil electrolytic capacitor, it has been found necessary to preform the electrode armatures at 35 volts direct current when the capacitor is intended for 10 volts alternating current operation. Such etched and oxidized foil electrolytic capacitors are characterized by one microfarad of capacity for each .35 square inch of active foil area. This is a greater foil area than is demanded by my new capacitor even when the surface is not etched. Were plain foil used in the electrolytic capacitor referred to, as is done in my new capacitor, the foil area necessary for 1 microfarad of capacity would be approximately 1.25 square inches, an area more than four times as great as in my new capacitor.

Capacitors embodying my invention are especially well suited for continuous duty at low voltages, that is, voltages of 15 volts or higher, or for intermittent duty at voltages as high as 110 volts when series-connected as described.

Capacitors, employing kraft paper made up in accordance with my invention, are characterized by high electrical stability when subjected to high temperature "shelf life," that is, periods of inactivity. Heated at 100° C. without voltage, the characteristics improve. The following power factor characteristics at 6 volts are illustrative:

|  | Per cent power factor |
|---|---|
| After voltage treatment | 28.2 |
| After paper swelling treatment at 15 hours at 100° C. and assembly and sealing in cans | 11.7 |
| Heated without applied voltage— | |
| At 100° C. for 80 hours | 9.2 |
| At 100° C. for 504 hours | 8.4 |
| At 100° C. for 100 days | 6.8 |

Similar high degree of electrical stability is shown when my capacitors are placed on voltage. With capacitors rated at 4½ volts alternating current, the power factor during a 6 volt alternating current life test dropped as follows:

|  | Per cent power factor |
|---|---|
| After 20 hours at 6 volts | 12.4 |
| After 1340 hours at 6 volts | 7.5 |
| After 206 days at 6 volts | 6.4 |

I do not wish to be understood as limited to the exact construction of my capacitor as herein described. Various modifications of the same coming within the true spirit and scope of my invention are meant to be covered in the appended claims.

What I claim as new and desire to secure by Letters Patent of the United States is:

1. An electric capacitor comprising the combination of juxtaposed unoxidized aluminum armatures, a non-aqueous solution of ammonium borate in ethylene glycol located in contact with said armatures, and at least one sheet of substantially non-porous pulped paper filling the space between said armatures under pressure and substantially insulating the same from one another, said paper having a density of at least about 0.95.

2. An electric capacitor comprising the combination of juxtaposed unoxidized film-forming armatures, a non-aqueous solution consisting of at least 5 per cent of ammonium borate in a polyhydric alcohol in contact with said armatures, and a substantially non-porous, swelled paper dielectric septum filling the spaces between said armatures, said septum having such low porosity that the capacity between said armatures varies inversely with the thickness of said septum.

3. An electric capacitor comprising the combination of juxtaposed unoxidized aluminum armatures, a non-aqueous solution containing at least 90 per cent of ethylene glycol and about 5 to 10 per cent ammonium borate between said armatures and non-porous swelled cellulose kraft paper also between said armatures, said material having a sufficiently high dielectric property to cause the capacity between said armatures to vary inversely with the thickness of said sheet material.

4. An electric capacitor comprising the combination of unoxidized aluminum armatures, swelled kraft paper therebetween and a substantially non-aqueous solution of ammonium borate in ethylene glycol wetting and adhering to said paper, said borate being present in the proportion of about 5 to 10 per cent by weight in said solution, said paper having sufficiently high dielectric property to cause the capacity between said armatures to vary inversely with the thickness of said septum and to permit said capacitor to operate without film-formation.

5. An electric capacitor comprising the combination of non-oxidized aluminum armatures assembled with interposed non-conducting sheet material in a compressed state, said sheet material consisting of one or more sheets of swelled kraft paper, and a solution of ammonium borate in substantially water-free polyhydric alcohol filling voids between said armatures.

FRANK M. CLARK.